United States Patent [19]

Moore et al.

[11] 3,890,287

[45] June 17, 1975

[54] POLYSULFONE COPOLYMERS

[75] Inventors: William R. Moore; Walter L. Vaughn, both of Lake Jackson, Tex.

[73] Assignee: The Dow Chemical Company, Midland, Mich.

[22] Filed: June 21, 1974

[21] Appl. No.: 481,623

Related U.S. Application Data

[63] Continuation-in-part of Ser. No. 399,779, Sept. 21, 1973, abandoned.

[52] U.S. Cl.. 260/79.3 A; 260/29.6 T; 260/29.6 SQ
[51] Int. Cl. .......................................... C08f 13/06
[58] Field of Search ............................... 260/79.3 A

[56] References Cited
UNITED STATES PATENTS

| | | | |
|---|---|---|---|
| 2,102,654 | 12/1937 | Snow | 260/79.3 A |
| 2,114,292 | 4/1938 | Frey et al. | 260/79.3 A |
| 2,198,936 | 4/1940 | Frey et al. | 260/79.3 A |
| 2,241,900 | 5/1941 | Brubaker et al. | 260/79.3 A |
| 2,253,775 | 8/1941 | Frey et al. | 260/79.3 A |
| 2,572,185 | 10/1951 | Noether et al. | 260/79.3 A |
| 2,703,793 | 3/1955 | Naylor | 260/79.3 A |
| 2,778,812 | 1/1957 | Dreisbach et al. | 260/79.3 A |
| 3,377,324 | 4/1968 | Mostert | 260/79.3 A |

FOREIGN PATENTS OR APPLICATIONS

| | | | |
|---|---|---|---|
| 38-23041 | 10/1963 | Japan | 260/79.3 A |

*Primary Examiner*—Ronald W. Griffin
*Attorney, Agent, or Firm*—Benjamin G. Colley

[57] ABSTRACT

Copolymers consisting of 5–50% $SO_2$, 10–90% of a monofunctional monomer such as styrene and 1–40% of a carboxylic monomer.

These copolymers are water dispersible in the salt form and are useful to render cellulosic substrates water repellant, as a polish or component thereof, or as a water soluble temporary protective coating.

5 Claims, No Drawings

POLYSULFONE COPOLYMERS

CROSS REFERENCE TO RELATED APPLICATIONS

This application is a continuation-in-part of Ser. No. 399,779 filed Sept. 21, 1973, now abandoned.

BACKGROUND OF THE INVENTION

This invention relates to a polysulfone copolymer which is the reaction product of sulfur dioxide, a monofunctional monomer and a carboxylic monomer.

It is known from U.S. Pat. No. 3,778,812 that aa terpolymer consisting of acrylic acid, vinyl alkyl ether and sulfur dioxide can be made. Terpolymers of acrylates, propylene and sulfur dioxide are also known from U.S. Pat. No. 2,703,793.

SUMMARY OF THE INVENTION

It has been found that copolymers or interpolymers generally consisting of (A) sulfur dioxide, (B) a monofunctional monomer, and (C) a carboxylic monomer can be prepared. These copolymers in the salt form are water dispersible and are useful to render cellulosic substrates and textiles water repellant when a fugitive base such as ammonia is used to prepare them. They are also useful as a component for polishes to obtain increased gloss, water resistance, and ease of removal by ammonia compositions. They are also useful as water soluble temporary protective coatings when inorganic bases are used to prepare them.

More specifically, the copolymers of this invention consist of an essentially random polymer consisting of A. about 5 to 50 percent by weight of $SO_2$;
B. about 10 to 90 percent by weight of a monofunctional monomer selected from
   1. vinyl aromatic monomers having 8 to 12 carbon atoms,
   2. alpha olefins of 5–30 carbons,
   3. cycloalkylenes having 4–8 carbon atoms,
   4. alkyl acrylates and alkyl methacrylates having 4–12 carbon atoms,
   5. vinyl alkanoates having 4–8 carbon atoms, or
   6. mixtures thereof; and
C. about 1 to 40 percent by weight of a carboxylic monomer selected from
   1. monoolefinically unsaturated dicarboxylic acids having 4–7 carbon atoms,
   2. monoolefinically unsaturated monocarboxylic acids having 3–5 carbon atoms or
   3. mixtures thereof.

The more preferred ranges of the monomers in the copolymers of this invention are about 10 to about 30 percent by weight of (A); about 50 to about 70 percent by weight of (B) and about 10 to about 25 percent by weight of (C).

The above copolymers are prepared in an inert organic solvent and then treated with inorganic bases or organic bases to form the useful salts thereof wherein the cationic moiety of the salt is an amine group, an ammonium group or an alkali metal radical.

DETAILED DESCRIPTION

The functional interpolymers of this invention are usually prepared by a solution precipitation process. However, other common polymerization techniques such as emulsion, suspension or bulk are equally effective in preparing these polymers.

In general, these functional polysulfones are prepared by saturating an inert organic solvent with sulfur dioxide gas, adding one or more of the monofunctional monomers, adding a catalyst solution and then adding the carboxylic monomer. The addition of sulfur dioxide usually is continued throughout the reaction. If desired, the catalyst solution can be mixed in with the monofunctional monomers and added with them. The polymers are then neutralized with an aqueous solution of an amine, ammonia or an inorganic base.

The inert solvents that can be used for the reaction are of three general types, i.e., hydrocarbons, halogenated hydrocarbons and oxygenated hydrocarbons. Examples of the first group are benzene, n-hexane, diethylbenzene, naphtha, kerosene. Examples of the second group are 1,1,1-trichloroethane, methylene chloride, perchloroethylene, chloroform, carbon tetrachloride, trichlorobenzene and the like. Examples of the third group are dioxane, methyl alcohol, butyl alcohol, acetone, methyl ethyl ketone, diethylene glycol dimethyl ether, dipropylene glycol monoethyl ether and the like. The advantage of using the first two groups of solvents is that the formed polymer precipitates out and is easily processed. Use of the third group of solvents usually results in a solution; the polymer is then isolated from the solvent by aqueous precipitation, distallation or evaporation or the like. The preferred solvents are 1,1,1-trichloroethane, methylene chloride and acetone.

The catalysts which can be used in this process are either ionic or free radical types. Examples of ionic types are silver nitrate, lithium nitrate, ammonium nitrate, as well as chlorates, perchlorates, nitrites, persulfates, and the like. Examples of the second group are t-butyl peroxypivalate, methyl ethyl ketone peroxide, acetyl peroxide, tertbutyl peroctoate, hydrogen peroxide, azobisisobutyronitrile and the like. Ionizing radiation may also be employed. The preferred catalysts are t-butyl peroxy pivalate and ammonium nitrate. When an ionic type is employed, the amount is generally from about 0.001 to about 0.5 percent and when the free-radical initiating type is employed, the amount is usually from about 0.05 to 5.0 percent, based on the weight of unsaturated monomers present.

The temperature of the reaction is not critical and can range from about −30°C to about 50°C. The preferred range is from 10° to 30°C. Ceiling temperatures of individual monomers will govern the maximum temperature operable. Below −30°C, refrigeration costs are considerable.

The pressure used for this reaction can range from about 1 to 100 pounds per square inch (gauge) with the preferred pressure being autogenous pressure developed during the reaction conditions employed. When operating outside these conditions, expensive pressure equipment is required.

In preparing the polysulfones of the present invention, it is generally found that substantially equimolar proportions of the unsaturated monomers and sulfur dioxide react together. In the case of styrene, tert-butyl styrene and the like, it is generally found that one mole of sulfur dioxide reacts with two moles of these aromatic-type monomers. Starting molar ratios of sulfur dioxide to the unsaturated monomers can range from 0.5 to 1 to 50:1 or more to facilitate the polymerization of the reactants and to provide, if desired, a reaction vehicle of liquid sulfur dioxide. It is preferred to use a slight excess of $SO_2$ to avoid the necessity of removing large volumes of the gas from the polymer.

The polymers of this invention have a molecular weight range of about $1 \times 10^4$ to about $17 \times 10^6$ as determined by gel permeation chromatography in tetrahydrofuran. They generally contain less than about 20% wt. $SO_2$ in the polymer. Differential Thermal Analysis shows no polymer transitions or reactions over a temperature range of 50°–200°C. Infra-red analysis confirms a typical olefin polysulfone structure.

Examples of vinyl aromatic monomers having 8 – 12 carbon atoms that can be used herein are styrene, alkyl substituted styrenes, chloro substituted styrenes, bromo substituted styrenes, and vinyl naphthalene.

Examples of the alpha olefins of 5–30 carbon atoms that can be used are 1-pentenes, 1-hexenes, 1-heptenes, 1-octenes, etc., as well as 1-octacosenes, 1-nonacosenes and 1-triacontenes. A preferred group of alpha olefins are those having 8–18 carbon atoms. If desired, the vinyl aromatic monomers can be mixed with the alpha olefins.

Examples of the cycloalkylenes having 4–8 carbon atoms are cyclopentene, cyclohexene, cyclobutene, dicyclopentadiene and the like.

Examples of the alkyl acrylates and alkyl methacrylates having 4–12 carbon atoms are methyl acrylate, methyl methacrylate, ethyl acrylate, 2-ethylhexyl acrylate, butyl acrylate, butyl methacrylate and the like.

Examples of the vinyl alkanoates having 4–8 carbon atoms are vinyl acetate, vinyl propionate, vinyl butyrate, vinyl pentanoate and the like.

Examples of the monoolefinically unsaturated dicarboxylic acids having 4–7 carbon atoms which can be used are maleic, fumaric, itaconic, teraconic, glutaconic, citraconic, mesaconic and vinyl succinic. It is to be understood that the corresponding anhydrides are also useful in making the above copolymers and that when these are neutralized the salts of the dicarboxylic acids are formed.

Examples of the monoolefinic unsaturated monocarboxylic acids having 3–5 carbon atoms that can be used are acrylic, methacrylic, crotonic, isocrotonic, angelic, and tiglic acid.

After the terpolymers are prepared in the organic solvents, the terpolymers are neutralized with either an organic base or an inorganic base.

Examples of the organic bases that can be used are monoethanalamine, methylamine, bimethylamine, ethylamine, diethylamine, trimethylamine, aminoethylethanolamine, ethylenimine, monoisopropanolamine, morpholine, ethylene diamine, pryridine, poly(ethylene glycol) diamine, tetramethylammonium hydroxide, ammonium hydroxide, and polyethylenimine.

Examples of the inorganic bases that can be used are sodium hydroxide, potassium hydroxide, lithium hydroxide, sodium carbonate, and sodium bicarbonate.

The invention is further illustrated by the following non-limiting examples.

EXAMPLES 1–22

Preparation of Base Polymer

A 3-liter Pyrex resin kettle was set up in a temperature-controlled glycol bath in an exhaust hood. The kettle was equipped with: a stainless steel paddle stirrer, a one-fourth inch I.D. $SO_2$ dip tube connected to a rotometer; a glass thermometer; a 5-bulb cold water condenser with drying tube. One of the solvents listed below were charged to the reactor and then saturated with $SO_2$ gas by sparging for several hours at about 2 g/min. The reactor was then charged with various monomers set forth below. The system was agitated at 100 rpm. Catalyst was added directly to the stirred pot contents. The reaction was allowed to proceed for the desired period of time. The polymer slowly precipitated from the reaction media. It was then vacuum filtered using a coarse glass-frit funnel. The polymer was solvent-washed several times (about 1 vol. solvent per wash) and then filtered. The resin was then rinsed with about one liter of fresh solvent and air-dried on a filter funnel to remove most of the residual solvent. It was then dried in a vacuum oven at about 27 inches Hg, at 55°C for 48 hours. The product was weighed, bottled, labeled and analyzed. The charges, conditions, and results of a series of these runs (as generally described above) are shown in Table I.

TABLE I

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| Styrene[1], g/moles | 208/2.0 | 208/2.0 | 208/2.0 | 208/2.0 | 312/3.0 | 312/3.0 | 208/2.0 | 0/0 |
| Maleic Anhydride[2], g/moles | 98/1.0 | 98/1.0 | 98/1.0 | 98/1.0 | 147/1.5 | 147/1.5 | 49/0.5 (24.2% M.A.)** | 20/0.2 |
| Acrylic Acid[3], g/moles | 0/0 | 0/0 | 0/0 | 0/0 | 0/0 | 0/0 | 0/0 | 0/0 |
| Alpha Olefin, g/moles | 140/1.0[4] | 0/0 | 0/0 | 0/0 | 0/0 | 253/1.0[9] | 112/0.5[10] | 224/1.0[10] |
| Other Monomer, g/moles | 0/0 | 184/1.0[7] | 0/0 | 132/1.0[8] | 0/0 | 0/0 | 0/0 | 0/0 |
| Solvent[5], grams | 2100[5] | 2100[5] | 2100[5] | 2100[5] | 2100[5] | 2100[5] | 1560[5] | 700[5] |
| Lupersol 11[6], grams | 8.7 | 8.7 | 8.7 | 8.7 | 8.7 | 8.7 | 6.9 | 8.7 |
| High/Low Range, Reaction Temp. °C | 23/10 | 23/10 | 23/10 | 23/10 | 11/10 | 11/10 | 13/10 | 20/10 |
| Reaction Time, Hrs. | 48 | 72 | 144 | 144 | 144 | 144 | 48 | 72 |
| Product Color and Form | white powder | white powder | white powder | white powder | white powder | white powder | white powder | clear visc.soln. |
| Polymer Yield, grams | 238 | 296 | 308 | 397 | 290 | 251 | 402 | 185 |
| Theor. Yield, % olefinic monomers | 42 | 65 | 83 | 70 | 55 | 30 | 81 | 58 |

|  | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|
| Styrene[1], g/moles | 0/0 | 312/3.0 | 0/0 | 0/0 | 0/0 | 0/0 | 312/3.0 |
| Maleic Anhydride[2], g/moles | 0/0 | 49/0.5 (13.3% M.A.)** | 20/0.2 | 32/0.33 | 0/0 | 32/0.33 | 98/1.0 |

TABLE I – Continued

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| Acrylic Acid[3], g/moles | 14/0.2 | 0/0 | 0/0 | 0/0 | 14/0.2 | 0/0 | 0/0 | |
| Alpha Olefin, g/moles | 112/0.5[10] | 0/0 | 253/1.0[9] | 280/2.0[4] | 253/1.0[9] | 350/2.5[4] | 0/0 | |
| Other Monomer, g/moles | 0/0 | 0/0 | 0/0 | 0/0 | 0/0 | 0/0 | 0/0 | |
| Solvent[5], grams | 500[13] | 1000[5] | 600[11] | 800[11] | 1000[11] | 1000[11] | 1000[5] | |
| Lupersol 11[6], grams | 18.0[14] | 4.4 | 11.3 | 16.1[12] | 11.3 | 4.4 | 9.5 | |
| High/Low Range, Reaction Temp. °C | 23/10 | 28/23 | 15/10 | 24/23 | 24/23 | 24/23 | 11/10 | |
| Reaction Time, Hrs. | 216 | 48 | 44 | 36 | 36 | 24 | 36 | |
| Product Color and Form | hazy non-vis.soln. | white powder | white powder | clear non-visc.soln. | clear visc.soln. | lt.pink semi-solid | white powder | |
| Polymer Yield, grams | 0 | 394 | 195 | 0 | 126 | N.A.* | 302 | |
| Theor. Yield, % olefinic monomers | 0 | 81 | 61 | 0 | 37 | low | 53 | |

|  | EXAMPLE 16 | EXAMPLE 17 | EXAMPLE 18 | EXAMPLE 19 | EXAMPLE 20 | EXAMPLE 21 | EXAMPLE 22 |
|---|---|---|---|---|---|---|---|
| Styrene[1], g/moles | 104/1.0 | 312/3.0 | 208/2.0 | 0/0 | 0/0 | 208/2.0 | 312/3.0 |
| Maleic Anhydride[2], g/moles | 25/0.25 | 147/1.5 (22.2% M.A.)** | 49/0.5 (23.6% M.A.)** | 49/0.5 | 0/0 | 98/1.0 (25.3% M.A.)** | 0/0 |
| Acrylic Acid[3], g/moles | 0/0 | 0/0 | 0/0 | 0/0 | 49/0.7 (10.7% A.A.)** | 0/0 | 72/1.0 |
| Alpha Olefin, g/moles | 0/0 | 0/0 | 0/0 | 506/2.0[9] | 506/2.0[9] | 196/1.0[16] | 0/0 |
| Other Monomer, g/moles | 32/0.25[15] | 0/0 | 32/0.25[15] | 0/0 | 0/0 | 0/0 | 0/0 |
| Solvent[5], grams | 700[11] | 2000[5] | 800[5] | 1600[11] | 1500[13] | 2000[5] | 1000[5] |
| Lupersol 11[6], grams | 8.7 | 8.7 | 13.1 | 17.3 | 19.9 | 8.7 | 8.7 |
| High/Low Range, Reaction Temp.°C | 20/10 | 23/20 | 23/10 | 15/10 | 24/23 | 24/23 | 24/23 |
| Reaction Time, Hrs. | 24 | 15 | 24 | 120 | 113 | 48 | 48 |
| Product Color and Form | white powder | white powder | white powder | yellow oil | white beads | white powder | white powder |
| Polymer Yield, grams | 108 | 438 | 291 | Low | 276 | 498 | 214 |
| Theor. Yield, % olefinic monomers | 58 | 67 | 73 | very low | 38 | 72 | 45 |

[1]caustic washed, 99+% pure.
[2]crystals, m.p. 52–54°C.
[3]Glacial, 200 ppm methyl ether hydroquinone.
[4]n-Decene-1, 95.6%.
[5]Dow, Inhibited 1,1,1-trichloroethane, 95+% pure.
[6]76% tert-butyl peroxypivalate in mineral spirits.
[7]2-Ethyl Hexyl Acrylate.
[8]92+% pure dicyclopentadiene.
[9]Octadecene-1, 92+% pure.
[10]Hexadecene-1, 92+% pure.
[11]Acetone.
[12]Includes 3 g. DuPont "Vazo"-azobisisobutyronitrile.
[13]Isopropanol, 99+% pure.
[14]Includes 3 g. "Vazo" catalyst and 3 g. $NH_4NO_3$ catalyst.
[15]Butyl Acrylate.
[16]Tetradecene-1, 92+% pure.
*N.A. = not applicable.
**Percent acid or anhydride determined by titration.

Selected resin examples were analyzed. The results confirm the fact that they are olefin polysulfones. Thus, Example 7 had a softening point of 240°C and a melting point of about 260°C with a carbon, sulfur, hydrogen, oxygen (CSHO) analysis of 68.2; 4.8; 6.3;20.7 percent by weight. Example 8 gave 66.9; 10.9; 10.9; 11.9. Example 10 had a peak molecular weight by gel permeation chromatography of $2.04 \times 10^6$, softening point of 245°C, a melting point of about 260°C, with a C,S,H,O analysis of 70.8; 7.4; 5.9 and 15.6.

EXAMPLES 23 – 25

Preparation of Aqueous Solutions/Dispersions of Resins Using $NH_4OH$ 25 of a styrene/maleic anhydride/$SO_2$ terpolymer (prepared in Example 17) was dissolved in 100 g. acetone by stirring on a magnetic stirrer overnight at room temperature to prepare a master batch. 25 g. portions of this master solution were placed into 2 oz. bottles and then the desired amount of 1N $NH_4OH$ was added and stirred for about 3 hours. The results are shown in Table II below.

After 3 weeks of shelf stability testing at 25°C. only Example 23 changed in appearance (from opaque tan color to an opaque red color). No changes in pH or viscosity were seen.

It can be seen that about one equivalent $NH_3$/eg. acid is required to completely solubilize the resin in the aqueous acetone solution. Excessive amounts of base (>pH 8) are to be avoided since polymer degradation will slowly take place. Less than about one equivalent of $NH_3$ will not solubilize the resin.

TABLE II

| Example Number | Polymer (g) | Polymer (Acid Equiv.) | Acetone (g) | 1N $NH_4OH$ (g) | $NH_3$ Equivalents | pH | Observed Solubility |
|---|---|---|---|---|---|---|---|
| 23 | 5 | 0.0227 | 20 | 30 | 0.0345 | 9 | Soluble, clear |
| 24 | 5 | 0.0227 | 20 | 23 | 0.0265 | 7 | Soluble, clear |
| 25 | 5 | 0.0227 | 20 | 20 | 0.0230 | 6 | Soluble, clear |

EXAMPLE 26 – 28

Preparation of Aqueous Dispersions/Solutions Using Amines or NaOH 0.5 g. samples of a styrene/maleic anhydride/$SO_2$ terpolymer (prepared in Example 17) was slurried in five samples of water using a magnetic stirrer. Various bases were added to each slurry and stirred overnight. The results are shown in Table III below.

TABLE III

| Example Number | Polymer Acid Equiv. | Base | Base g/equiv. | Observations |
| --- | --- | --- | --- | --- |
| 26 | 0.0023 | Monoethanolamine | 0.373g/0.0061 | opaque viscous paste |
| 27 | 0.0023 | NaOH | 0.008/0.0002 | slightly viscous slurry |
| 28 | 0.0023 | NaOH | 0.068/0.0017 | viscous slurry (<1000 cps) |

A 15 mil, wet film cast from the slurry of Example 26 and ovencured at 150°C for 15 minutes gave an opaque, hard, tough film—resistant to $H_2O$. When diethanolamine and triethanolamine were tried as in Example 26 the polymer precipitated. The films prepared from Examples 27 and 28 gave a similar film except that they were water soluble.

EXAMPLES 29 – 40

Plasticized Films Cast From Aqueous Dispersions of Styrene/Maleic Anhydride/$SO_2$—$NH_3$+Salt:

A master solution of 25 g. styrene/maleic anhydride/$SO_2$ terpolymer (prepared in Example 17) was prepared in acetone (100 g) and 123 mls. of 1 N $NH_4$OH was added to this solution. Upon stirring it formed a viscous opaque dispersion (pH 7) with a styrene odor. The composition of the master solution was:

| | |
| --- | --- |
| 10.10% | Polymer |
| 0.97% | $NH_3$ |
| 48.61% | $H_2O$ |
| 40.32% | Acetone |
| 100.00% | |

Five gram portions of the master solution were diluted with 15 g. deionized water to yield a 2.77% solids neutralized solution, clear and water-white. Various plasticizers were added to make water white, solutions, stirred to make homogenous, and then 20 mil films were cast on 8 × 12 inch glass plates from these solutions. After air drying three days, the films were observed for color, optical clarity, tack, brittleness, hardness and $H_2O$ resistance. The results are shown in Table IV. The films are listed in descending order of overall quality as observed.

The best plasticizers tested were the polyethylene glycol or glycerin type but all those tested decreased water resistance of the cured film.

TABLE IV

PLASTICIZERS

| Ex. | Name of Plasticizer | Description | Wt.(g) | Wt.% Based on Total Solids | Optical Clarity O=Opaque T=Transp. | Tack | Hardness S=Soft H=Hard | $H_2O$ Resistance |
| --- | --- | --- | --- | --- | --- | --- | --- | --- |
|  | NONE | CONTROL | 0 | 0 | T | None | H | Insoluble |
| 29 | Diethylene Glycol | Food Grade | 0.50 | 47.5 | T | Heavy | S | Sensitive |
| 30 | Dowfax 9N10 | Ethylene oxide, Adduct of Nonyl Phenol containing 10 mole E.O./mole of phenol | 0.10 | 15.3 | T | None | H | Very soluble |
| 31 | Dowfax 9N10 | Ditto | 0.50 | 47.5 | T | None | H | Very soluble |
| 32 | Glycerin | U.S.P. Grade | 0.50 | 47.5 | T | Heavy | S | Sl. soluble |
| 33 | Polyglycerin NC1914 | 10% glycerin, 20% diglycerin, 70% tri, tetra, penta glycerin | 0.50 | 47.5 | T | None | S | Very soluble |
| 34 | Dipropylene Glycol Dowfax 9N10 | | 0.50 0.10 | 52.0 | T | None | H | Very soluble |
| 35 | Polyglycerin NC2109 | 75% Diglycerin, 5% glycerin, 20% tri,tetra, and penta glycerin | 0.50 | 47.5 | T | Slight | S | Sl. soluble |
| 36 | Dipropylene Glycol | Food Grade | 0.50 | 47.5 | Translu. | Slight | S | Very soluble |
| 37 | Polyglycol E-400 | Poly(ethyleneglycol) mw=400 | 0.50 | 47.5 | T | Heavy | S | Very soluble |
| 38 | Dipropylene Glycol | Food Grade | 1.00 | 64.4 | Translu. | Heavy | S | Sl. soluble |
| 39 | Dowfax 9N40 | 40 moles E.O. Adduct of nonyl phenol | 0.10 | 15.3 | T | None | H | Very soluble |
| 40* | Dowfax 9N6 | 6 moles E.O. Adduct of nonyl phenol | 0.50 | 47.5 | T | Slight | S | Very soluble |

*Example 40 had the appearance of Fisheyes.
Note: Brittleness tests revealed all Examples (except CONTROL) to be tough. CONTROL was Brittle.

EXAMPLE 41 – 48

Crosslinked Films Cast From Aqueous Dispersions of Styrene/Maleic Anhydride/$SO_2$ — $NH_3$+Salt A master solution was prepared as in Examples 34–50.

Various crosslinking agents were added to 10 g. portions of the master solution, and then the compositions were stirred to make them homogenous. Films (20 mils wet) were cast on 8 × 12 inch glass plates from these homogenous compositions. These films were oven cured at 150°C for 5 minutes. The films were then observed for color, optical clarity, brittleness, adhesion and water resistance.

It can be seen that a combination of DER 736 crosslinker and D.E.G. plasticizer gave a film with overall good properties. (See Table V below).

TABLE V

CROSSLINKERS

| Ex. | Name | Description | Wt. (g.) | Wt. % Based on Total Solids | Color | Optical Clarity O=Opaque T=Transp. | Brittleness B=Brittle T=Tough | Adhesion | $H_2O$ Resistance |
|---|---|---|---|---|---|---|---|---|---|
|  | None | CONTROL-1 | 0 | 0 | water white | T | very B | none | Sensitive |
|  | None | CONTROL-2 (D.E.G. only) | 0.2 | 0 | lt.yellow | T | B | good | soluble |
| 41 | D.E.R. 732 | Polyglycol diglycidylether epoxide eq.wt.=305–335 | 0.2 | 15.3 | tan | O | very B | none | insensitive |
| 42 | D.E.R. 736 | Polyglycol diglycidyl ether epoxide eq.wt. =175–205 | 0.2 | 15.3 | tan | O | very B | little | insensitive |
| 43 | Rhonite R-2 | Modified urea-formaldehyde resin (Rohm & Haas) | 0.2 | 15.3 | lt.brown | O | very B | fair | sensitive |
| 44 | D.E.R. 732 + Diethylene Glycol (D.E.G.) |  | 0.2 0.2 | 15.3 | lt.yellow | O | very B | fair | swellable |
| 45 | D.E.R. 736 + D.E.G. |  | 0.2 0.2 | 15.3 | lt.yellow | T | B | good | insensitive |
| 46 | Rhonite R-2 + D.E.G. |  | 0.2 0.2 | 15.3 | lt.brown | T | B | good | sensitive |
| 47 | Dimethyl dihydroxy ethylene Urea + D.E.G. |  | 0.2 0.3 | 15.3 | lt.yellow | T | B | good | soluble |
| 48 | Glycerin diepoxide + D.E.G. |  | 0.1 0.2 | 7.6 | lt.yellow | T | B | good | soluble |

EXAMPLES 49 – 54

In order to illustrate the method of water-proofing cellulosic materials, samples of filter paper 11.0 cm diamter were soaked in a 5.8% aqueous solution of the ammonium salts of the polymers prepared in Examples 2, 4, 8, 17, 20 and 21.

These samples were then dried for 30 seconds in a hot press at 370°F. This gave a dried sample having about 5.8% add-on weight of the polymeric salt.

Water drops were then placed on these dried samples and the contact angle measured. The results are shown in Table VI below.

TABLE VI

| Paper With Polymer of Ex. No. | Example Number | Contact Angle * | Typical Utility |
|---|---|---|---|
| Control | (no polymer) | 11° | Book, magazine |
| 2 | 49 | 116° | Ruling, writing |
| 4 | 50 | 69° | Newsprint |
| 8 | 51 | 11° | Book, magazine |
| 17 | 52 | 111° | Ruling, writing |
| 20 | 53 | 10° | Book, magazine |
| 21 | 54 | 101° | Ruling |

*Astm D-724-45

In this test a contact angle greater than 90° indicates excellent water resistance; contact angles of about 50° or above indicates slack sizing desired for some grades of paper.

The polymers of Examples 2 and 17 were further tested at 5.8% add-on or weight pickup and 0.58% add-on. The Examples illustrating these results are shown in Table VII below.

TABLE VII

| EXAMPLE | Paper With Polymer of Ex. No. | % Add-on | COBB TEST (I) | INK RESISTANCE (II) | POROSITY (III) | TYPICAL UTILITY |
|---|---|---|---|---|---|---|
| 55 | Ex. 17 | 5.8 | 22.4 | 1800 | 23.4 | Butcher's Wrap, Ledger Bond, Liner Paper |
| 56 | Ex. 2 | 5.8 | 24.4 | >5000 | 23.2 | Butcher's Wrap, Ledger Bond, Liner Paper |
| 57 | Ex. 17 | 0.58 | 113.2 | 1.1 | 20.4 | Ruling |
| 58 | Ex. 2 | 0.58 | 115.2 | 3.0 | 18.0 | Ruling |
| CONTROL |  | 0 | 109.6 | 0.1 | 18.2 | Blotter paper, Filter Paper |

I - ASTM D-2045-64T
II - The ink resistance test was performed on a Hercules Sizing Tester using Hercules Test Ink No. 2 (Formic acid base).
III - ASTM D-726-58

What we claim is:
1. An essentially random copolymer consisting of
   A. about 10 to 30 percent by weight of $SO_2$,
   B. about 50 to 70 percent by weight of
      1. vinyl aromatic monomers having 8–12 carbon atoms,
      2. alpha olefins having 8–18 carbon atoms,
      3. cycloalkylenes having 4–8 carbon atoms,
      4. alkyl acrylates or alkyl methacrylates having 4–12 carbon atoms, or
      5. mixtures thereof; and
   C. about 10 to 25 percent by weight of monoolefinically unsaturated dicarboxylic acids having 4–7 carbon atoms.
2. A copolymer as set forth in claim 1 wherein the copolymer is in the salt form and the cationic moiety of the salt is an amine group, an ammonium group or an alkali metal radical.
3. A copolymer as set forth in claim 1 wherein (B) consists of (1) and (2).
4. A copolymer as set forth in claim 1 wherein (B) consists of (1) and (3).
5. A copolymer as set forth in claim 1 wherein (B) consists of (1) and (4).

* * * * *

UNITED STATES PATENT OFFICE
CERTIFICATE OF CORRECTION

PATENT NO. : 3,890,287
DATED : June 17, 1975
INVENTOR(S) : W. R. Moore, W. L. Vaughn It is certified that error appears in the above-identified patent and that said Letters Patent are hereby corrected as shown below:

Col. 1, line 12, please correct the U.S. Pat. No. 3,778,812 to -- 2,778,812 --.

Col. 1, line 12, please correct the "aa" to -- a --.

Col. 5 and 6, please delete Example Nos. 1-8.

Signed and Sealed this twenty-third Day of December 1975

[SEAL]

Attest:

RUTH C. MASON
Attesting Officer

C. MARSHALL DANN
Commissioner of Patents and Trademarks